(12) United States Patent
Levin et al.

(10) Patent No.: US 11,647,034 B2
(45) Date of Patent: May 9, 2023

(54) SERVICE ACCESS DATA ENRICHMENT FOR CYBERSECURITY

(71) Applicant: Microsoft Technology Licensing, LLC, Redmond, WA (US)

(72) Inventors: Roy Levin, Haifa (IL); Andrey Karpovsky, Kiryat Motzkin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 17/019,219

(22) Filed: Sep. 12, 2020

(65) Prior Publication Data
US 2022/0086179 A1    Mar. 17, 2022

(51) Int. Cl.
*H04L 9/40* (2022.01)
*G06F 16/28* (2019.01)
*H04W 12/63* (2021.01)

(52) U.S. Cl.
CPC ........ *H04L 63/1425* (2013.01); *G06F 16/285* (2019.01); *H04L 63/107* (2013.01); *H04W 12/63* (2021.01)

(58) Field of Classification Search
USPC .......................................................... 726/23
See application file for complete search history.

(56) References Cited

U.S. PATENT DOCUMENTS

| | | |
|---|---|---|
| 10,382,461 B1 | 8/2019 | Sharifi Mehr et al. |
| 11,349,857 B1 * | 5/2022 | Shah .................. G06F 16/2379 |
| 2004/0128615 A1 | 7/2004 | Carmel et al. |
| 2006/0048106 A1 | 3/2006 | Citron et al. |

(Continued)

FOREIGN PATENT DOCUMENTS

| | | | | |
|---|---|---|---|---|
| CN | 106708978 A | * | 5/2017 | ......... G06F 16/9535 |
| JP | 5973636 B1 | * | 8/2016 | ............. G06F 17/16 |

OTHER PUBLICATIONS

"International Search Report and Written Opinion Issued in PCT Application No. PCT/US21/035561", dated Sep. 15, 2021, 10 Pages.

(Continued)

*Primary Examiner* — Sakinah White Taylor
(74) *Attorney, Agent, or Firm* — Ogilvie Law Firm

(57) ABSTRACT

Enriched access data supports anomaly detection to enhance network cybersecurity. Network access data is enriched using service nodes representing resource provision and other services, with geolocation nodes representing grouped access origins, and access values representing access legitimacy confidence. Data enrichment provides a trained model by mapping IP addresses to geolocations, building a bipartite access graph whose inter-node links indicate aspects of accesses from geolocations to services, and generating semantic vectors from the graph. Vector generation may include collaborative filtering, autoencoding, neural net embedding, and other machine learning tools and techniques. Anomaly detection systems then calculate service-geolocation or geolocation-geolocation vector distances with anomaly candidate vectors and the model's graph-based vectors, and treat distances past a threshold as anomaly indicators. Some embodiments curtail false positives relative to simply checking network access logs or packets for activity coming from unexpected places. Some avoid or reduce model retraining.

20 Claims, 5 Drawing Sheets

(56) References Cited

U.S. PATENT DOCUMENTS

| | | |
|---|---|---|
| 2007/0027873 A1 | 2/2007 | Factor et al. |
| 2007/0265999 A1 | 11/2007 | Amitay et al. |
| 2008/0141233 A1 | 6/2008 | Gurevich et al. |
| 2008/0313496 A1 | 12/2008 | Prabhakaran et al. |
| 2009/0055813 A1 | 2/2009 | Haber et al. |
| 2009/0319484 A1 | 12/2009 | Golbandi et al. |
| 2011/0131202 A1 | 6/2011 | Cohen et al. |
| 2013/0124576 A1 | 5/2013 | Adir et al. |
| 2013/0196305 A1 | 8/2013 | Adir et al. |
| 2014/0214396 A1 | 7/2014 | Adir et al. |
| 2014/0237450 A1 | 8/2014 | Levy et al. |
| 2015/0046138 A1 | 2/2015 | Adir et al. |
| 2015/0261649 A1 | 9/2015 | Boehm et al. |
| 2015/0263999 A1 | 9/2015 | Levin et al. |
| 2016/0063071 A1 | 3/2016 | Guy et al. |
| 2016/0188711 A1 | 6/2016 | Levin et al. |
| 2016/0217392 A1 | 7/2016 | Hashavit et al. |
| 2016/0246705 A1 | 8/2016 | Bitar et al. |
| 2017/0068746 A1 | 3/2017 | Levin et al. |
| 2017/0103012 A1 | 4/2017 | Bitar et al. |
| 2017/0103099 A1 | 4/2017 | Bitar et al. |
| 2017/0109255 A1 | 4/2017 | Adir et al. |
| 2017/0109515 A1 | 4/2017 | Aharoni et al. |
| 2017/0124324 A1 | 5/2017 | Peleg et al. |
| 2017/0193375 A1 | 7/2017 | Bitar et al. |
| 2017/0220945 A1 | 8/2017 | Barger et al. |
| 2017/0228418 A1 | 8/2017 | Levin et al. |
| 2017/0323463 A1 | 11/2017 | Leiba et al. |
| 2018/0137303 A1 | 5/2018 | Farkash et al. |
| 2018/0152465 A1 | 5/2018 | Levin et al. |
| 2018/0158061 A1 | 6/2018 | Edelstein et al. |
| 2018/0189296 A1 | 7/2018 | Ashour et al. |
| 2018/0232518 A1 | 8/2018 | Copty et al. |
| 2018/0232520 A1 | 8/2018 | Frandzel et al. |
| 2018/0232523 A1 | 8/2018 | Copty et al. |
| 2018/0278633 A1 | 9/2018 | Brutzkus et al. |
| 2018/0302423 A1 * | 10/2018 | Muddu ............... G06F 3/04842 |
| 2018/0349599 A1 | 12/2018 | Teller et al. |
| 2019/0278922 A1 | 9/2019 | Levin et al. |
| 2020/0021607 A1 | 1/2020 | Muddu et al. |
| 2020/0042694 A1 | 2/2020 | Karpovsky et al. |
| 2020/0053090 A1 | 2/2020 | Kliger et al. |
| 2020/0053123 A1 | 2/2020 | Pliskin et al. |
| 2020/0057850 A1 | 2/2020 | Kraus et al. |
| 2020/0057953 A1 | 2/2020 | Livny et al. |
| 2020/0067980 A1 | 2/2020 | Livny et al. |
| 2020/0236125 A1 | 7/2020 | Wright et al. |
| 2020/0274894 A1 | 8/2020 | Argoeti et al. |

OTHER PUBLICATIONS

Yifan Hu, et al., "Collaborative Filtering for Implicit Feedback Datasets", retrieved from <<http://yifanhu.net/PUB/cf.pdf>>, 2008, 10 pages.

"Batch Geolocation of IP addresses", retrieved from <<https://batchgeo.com/features/geolocation-ip-lookup/>>, no later than Aug. 31, 2020, 6 pages.

Wendell Santos, "APIs show Faster Growth Rate in 2019 than Previous Years", retrieved from <<https://www.programmableweb.com/news/apis-show-faster-growth-rate-2019-previous-years/research/2019/07/17>>, Jul. 17, 2019, 6 pages.

* cited by examiner

Fig. 4

SOME EXAMPLES OF SOME SERVICE IDENTIFIERS 400

- APPLICATION PROGRAM INTERFACE (API) 402 IDENTIFIER 404
- STORAGE RESOURCE 406 IDENTIFIER 408
- WEB SERVICE 440 IDENTIFIER 442
- NETWORK RESOURCE 410 IDENTIFIER 412
- ENDPOINT 414 UNIFORM RESOURCE LOCATOR (URL) 416
- UNIFORM RESOURCE IDENTIFIER (URI) 418
- COMPUTE RESOURCE 432 IDENTIFIER 434
- SOFTWARE-AS-A-SERVICE 420 IDENTIFIER 422
- PLATFORM-AS-A-SERVICE 424 IDENTIFIER 426
- EMAIL SERVICE 436 ADDRESS 438
- INFRASTRUCTURE-AS-A-SERVICE 428 IDENTIFIER 430

Fig. 5

SOME EXAMPLES OF SOME GEOLOCATION IDENTIFIERS 500

- BUILDING 502
- CAMPUS 504
- DISTRICT 506
- CITY 508
- COUNTY 510
- PROVINCE 512
- COUNTRY 514
- STATE 516
- MULTI-COUNTRY REGION 518
- METROPOLITAN AREA 520
- REGULATORY JURISDICTION 522
- LEGAL JURISDICTION 524

Fig. 6

SOME EXAMPLES OF ACCESS VALUES 310

- COUNT 602
- DURATION 604
- FREQUENCY 606
- RECENCY 608
- DISTRIBUTION 610 OVER INTERVALS 612
- LEGITIMACY CONFIDENCE 614

SERVICE ACCESS DATA ENRICHMENT FOR CYBERSECURITY

BACKGROUND

Attacks on computing systems take many different forms, including some forms which are difficult to predict, and forms which may vary significantly from one situation to another. But a wide variety of hardware and software tools may be available in a given situation to improve cybersecurity. Detection tools may detect anomalies, rule violations, unexpected behaviors, and other events or conditions that can be investigated by a security analyst. Many devices and some tailored tools provide forensic data, such as by maintaining logs that help track events of potential or likely interest. Some tools aid the investigation of events in a computing system, by consolidating events from multiple sources, correlating events based on timecodes, and providing computational functionality to sort or filter events. Some tools help analysts or other security personnel with incident handling, which may include investigation efforts as well as steps that try to limit the scope of an attack and reduce or repair the damage caused by the attack.

However, attackers continue to create new kinds of attacks and to improve the effectiveness of known attack categories. Accordingly, cybersecurity technical advances, even those that are incremental, may be helpful.

SUMMARY

Some embodiments help reduce or avoid false positives when checking network service access logs or real-time data for activity coming from unexpected places. Instead of simply checking whether an access originates from an IP address in a suspicious or unusual geographic location, some embodiments utilize semantic geolocation vectors that correspond to countries or other geolocations, which correspond in turn to IP addresses or other network addresses. These geolocation vectors are "semantic" in that two geolocations which are both likely to non-maliciously access a given network-based service (according to the access data that was used to generate the vectors) will be close to one another under a vector distance metric. Conversely, geolocation vectors which are farther apart from each other under the distance metric are less likely to correspond to two geolocations that both originated legitimate accesses to the same service. Service vectors are also generated and used for access anomaly detection in some embodiments.

Some embodiments use or provide a cybersecurity data enrichment hardware and software combination which includes a digital memory and a processor which is in operable communication with the memory. The processor is configured, e.g., by tailored software, to perform certain steps for service access data enrichment and anomaly detection support. The steps include obtaining a map of IP addresses to geolocations, and building a bipartite access graph having links. Each link has a service node and a geolocation node connected by the link. Each service node has a service identifier identifying a service, and each geolocation node has a geolocation identifier identifying a geolocation. Each link connects the service node of the link with the geolocation node of the link, and has an access value derived from at least one service access from the geolocation to the service.

In these embodiments, the steps also include generating a respective service vector for at least one service node, with the service vector based on at least the access values of one or more links which connect to the service node, and generating a respective geolocation vector for at least one geolocation node, with the geolocation vector based on at least the access values of one or more links which connect to the geolocation node. In a variation, the vector for each node is based on at least the access values of all links which connect to the node. Vector generation may be done, e.g., by collaborative filtering or in other ways noted below. The service vectors and geolocation vectors are collectively referred to as "graph-based vectors".

In these embodiments, the steps also include associating at least two of the generated vectors with an anomaly detection system. In this manner, a cybersecurity data enrichment system is configured to support detection of anomalous service accesses such that a similarity of two given vectors corresponds with a likelihood that a given service was non-maliciously accessed.

Some embodiments use or provide steps for a cybersecurity method utilizing vector-enriched service access data to support detection of an anomalous service access. The steps may include: acquiring a set of graph-based vectors generated from a bipartite access graph as described in the preceding paragraph, getting an anomaly candidate service access description which includes at least a service identifier and a geolocation identifier corresponding to an anomaly candidate service access, procuring at least one anomaly candidate vector that is based on at least the anomaly candidate service access description, calculating a vector distance using at least the anomaly candidate vector, and classifying the anomaly candidate service access either as anomalous or as non-anomalous, the classifying based at least in part on the vector distance.

Some embodiments use or provide a computer-readable storage medium configured with data and instructions, or use other computing items, which upon execution by a processor cause a computing system to perform a service access data vector-enrichment method to support detection of an anomalous service access. In particular, some embodiments obtain a map of IP addresses to geolocations, build a bipartite access graph as described above, and generate respective service vectors and geolocation vector for service nodes and geolocation nodes, based on at least the access values of links which connect to the nodes. In this way, vector-enriched service access data (i.e., the graph-based nodes) is generated such that a similarity of two given vectors corresponds with a likelihood that a given service was non-maliciously accessed.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some examples of service identifiers that identify network-accessible services;

FIG. 5 is a block diagram illustrating some examples of geolocations;

FIG. 6 is a block diagram illustrating some examples of access values associated with service access graph links;

DETAILED DESCRIPTION

Overview

Figure 1:
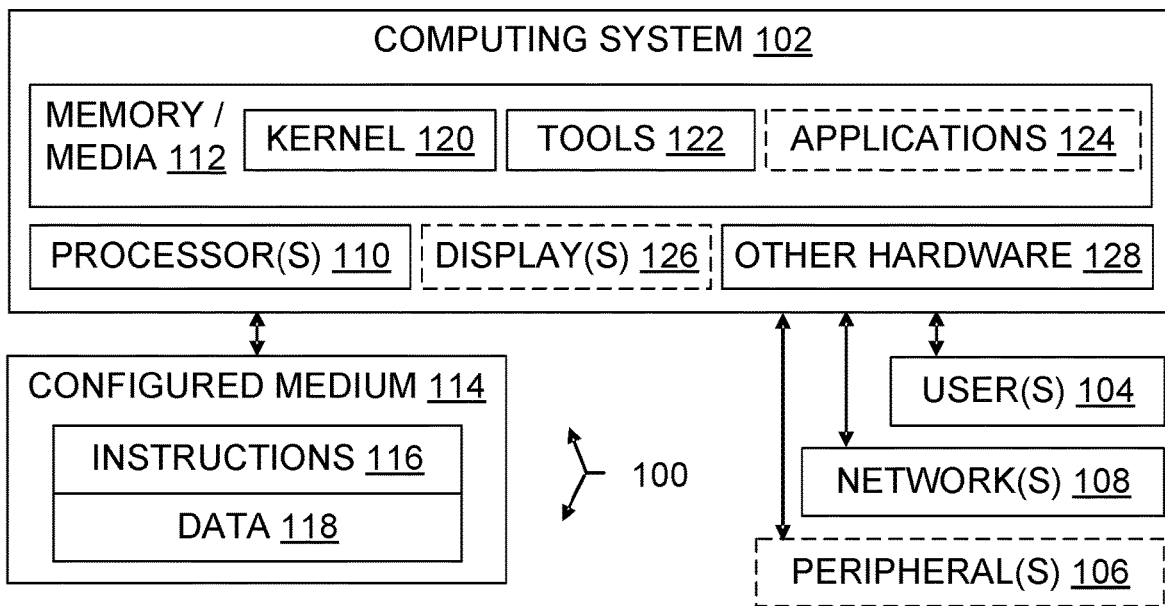
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the usability, efficiency, and effectiveness of Microsoft cybersecurity offerings, including versions of some Azure® Security Center solutions, Windows® Defender Advanced Threat Protection (ATP) offerings, or Azure Sentinel® security information and event management (SIEM) tools (marks of Microsoft Corporation).

The innovators observed that many cybersecurity detection engines alert on geographic anomalies, e.g., when a client IP-address from an anomalous location is accessing a service. This anomaly detection may be done by mapping IP addresses to geolocations such as countries. Some approaches trigger alerts that indicate, for instance, that a service was accessed from Country X for the first time. Yet such alerts have also been or created many false positives, as there may be many legitimate reasons for a client to access a resource from a new location, such as connecting via a virtual private network (VPN) or traveling abroad. The large number of false positives from non-enhanced solutions hampers effective detection and investigation of serious security risks.

Thus, a technical challenge faced by the innovators was to how to reduce the number of false positives during service access anomaly detection. One emergent subsidiary challenge was how to enrich service access data to produce semantic vectors usable for anomaly detection. Another technical challenge was how to avoid retraining an anomaly detection system without unduly sacrificing anomaly detection accuracy. Yet another challenge was how to map IP addresses to geolocations to support anomaly detection with graph-based semantic vectors. An additional technical challenge was how to quantify the confidence that a particular access is non-malicious, for the purpose of enriching service access data to support vector-based anomaly detection. One of skill will recognize these and other technical challenges as they are addressed at various points within the present disclosure.

In particular, to avoid creating so many false positives some embodiments taught herein generate a semantic representation for each geolocation, such that if a service is likely to be accessed from two different locations then those two geolocations have similar vector representations. As a result, during anomaly detection geolocations per se are replaced by semantic vectors, and alerts are produced when vectors that accessed a service historically are very different from the vector of a current access. Vectors being "different" corresponds to vectors being distant from one another under a vector metric, e.g., when a vector cosine distance is above a specified threshold. Other aspects of these embodiments, as well as other embodiments for service access data enrichment or for utilization of enriched service access data in anomaly detection, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, functionality for service access data enrichment or for utilization of enriched service access data in anomaly detection could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
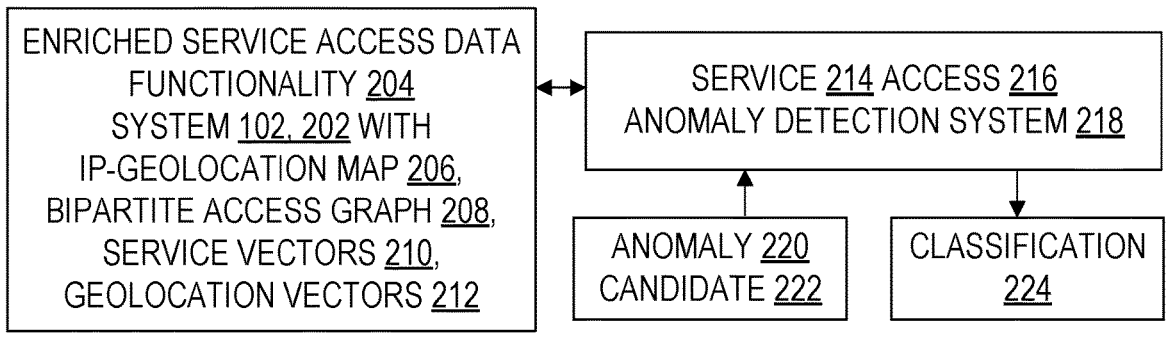
FIG. 2 is a block diagram illustrating a computing system equipped with cybersecurity data enrichment functionality, and some aspects of a surrounding context.

FIG. 2 illustrates an environment having an enhanced system 202, 102 that includes functionality 204 for service access data enrichment or for utilization of enriched service access data in anomaly detection, or both. The enhanced system 202 is also referred to herein as an "enriched service access data functionality system". When emphasizing the enrichment of service access data to produce graph-based vectors as taught herein, the enhanced system 202 may be referred to as a "cybersecurity data enrichment system". In a context which indicates that anomaly detection is being or can be performed using enriched service access data (graph-based vectors), the enhanced system 202 may be referred to as an "anomaly detection system" or an "enhanced anomaly detection system".

In particular, the illustrated system 202 includes an IP-geolocation map 206, a bipartite access graph 208 whose geolocation nodes correspond to at least some of the geolocations in the IP-geolocation map 206, service vectors 210 generated from the bipartite access graph 208, and geolocation vectors 212 generated from the bipartite access graph 208. Each service vector 210 corresponds to a service node of the bipartite access graph 208 and represents a service 214 (or group of services 214) which can be or has been (or both)

accessed from an IP address in the IP-geolocation map 206. Unless indicated otherwise, both successful accesses (e.g., those that yield control of resources or desired data) and unsuccessful access attempts (e.g., those denied or timed out due to lack of authorization or an error) are treated as accesses 216 herein.

As an implementation note, generally the graph 208 is more efficiently implemented as a sparse (not dense) graph. That is, if geolocation GL1 didn't access service S1 then there is no link between the GL1 and S1 nodes. A less efficient alternative is to place a link 318 with a weight (access value 310) of zero between the GL1 and S1 nodes. Also, in general a particular service would not ever have more than one service vector. Different services that are not grouped together on the same node 314 could have the same service vector, but that would be rare. Similarly, a particular geolocation would not ever have more than one geolocation vector, and although different geolocations that are not grouped together on the same node 316 could have the same geolocation vector, that would be rare. Multiple IP addresses 304 may be grouped for treatment as a single geolocation.

FIG. 2 also shows an anomaly detection system 218, which from context such as communication with the enhanced system 202 is understood to be an enhanced anomaly detection system that performs access anomaly detection utilizing one or more of the vectors 210 or 212 or both that were generated from the bipartite access graph 208. A service access anomaly 220 is an access that is unusual or suspect or outside typical access patterns, as determined with vector distance criteria taught herein. An access 216 that is under examination or flagged for examination to check whether it is an anomaly is referred to as an anomaly candidate 222. In the FIG. 2 example, anomaly candidates 222 are fed to or gathered by the enhanced anomaly detection system 218, which utilizes the vectors 210 or 212 or both and related criteria to produce a classification 224; the classification 224 classifies the anomaly candidate 222 as being an anomaly, or as not being an anomaly.

Figure 3:
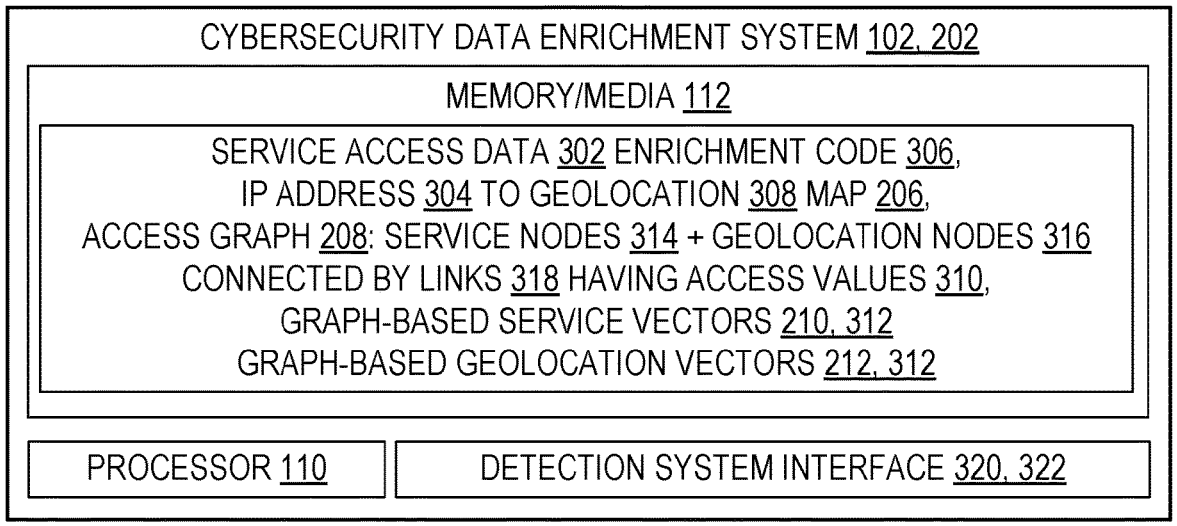
FIG. 3 is a block diagram illustrating an enhanced computing system configured with cybersecurity data enrichment functionality.

FIG. 3 further illustrates an example enhanced system 202 which has enrichment functionality 204. Service access data 302 such as log entries or real-time packet captures describe accesses 216 from IP addresses 304 to services 214. Enrichment code 306 executed by a processor 110 does one or more of the following: maps IP addresses to geolocations 308, updates access values 310, builds or updates the access graph 208, or generates the service vectors 210 and geolocation vectors 212 (collectively referred to as graph-based vectors 312). For instance, the software 306 may perform a method 1200 illustrated in one or more of FIGS. 10 through 12.

In this example, the access graph 208 includes service nodes 314 and geolocation nodes 316 connected by links 318. The access values 310 are associated with the links 318. The illustrated system 202 also includes an interface 320 to the anomaly detection system 218. This particular anomaly detection system interface 320 is an example of interfaces 322 generally. An enhanced system 202 may be networked generally or communicate in particular (via network or otherwise) with a SIEM and other devices through one or more interfaces 322. An interface 322 may include hardware such as network interface cards, software such as network stacks, APIs, or sockets, combination items such as network connections, or a combination thereof.

Each service node 314 of the access graph 208 data structure has one or more service identifiers 400 that identify respective services 214. FIG. 4 illustrates several examples of service identifiers 400. These items are discussed at various points herein, and additional details regarding them are provided in the discussion of a List of Reference Numerals later in this disclosure document.

Each geolocation node 316 of the access graph 208 data structure has one or more geolocation identifiers 500 that identify respective geolocations 308. FIG. 5 illustrates several examples of geolocation identifiers 500. These items are discussed at various points herein, and additional details regarding them are provided in the discussion of a List of Reference Numerals later in this disclosure document.

FIG. 6 illustrates some examples of access values 310. These items are discussed at various points herein, and additional details regarding them are provided in the discussion of a List of Reference Numerals later in this disclosure document.

Figure 7:
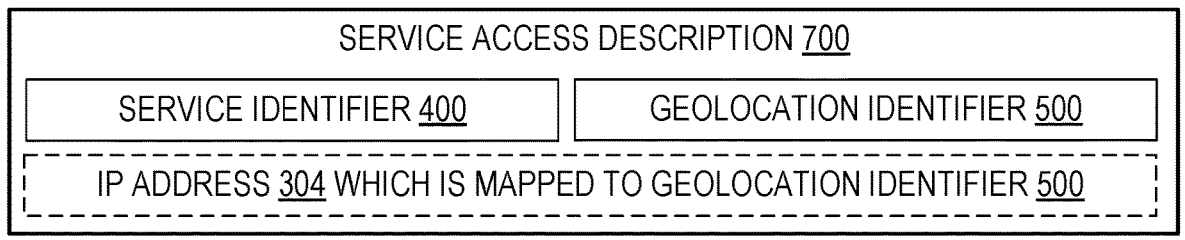
FIG. 7 is a block diagram illustrating a service access description.

FIG. 7 illustrates service access descriptions 700. Each description 700 includes a service identifier 400, and either explicitly or implicitly also identifies a geolocation 308. The geolocation 308 may be identified explicitly using a geolocation identifier 500, or the geolocation 308 may be identified implicitly by an IP address 304, since IP addresses are mapped 206 to geolocations 308. When IP addresses are used thus, the service access descriptions 700 may be in the form of conventional access activity log entries or packet captures, for example. When geolocations 308 are identified explicitly using geolocation identifiers 500, the service access descriptions 700 may be data structures which are implemented specifically for an embodiment of an enhanced system 202 as taught herein. Virtual geolocations 308 may also be defined, e.g., an IoT device "country" that includes geographically widespread IoT devices, or an in-company "factory campus" that includes company X factory buildings that are geographically widespread.

Figure 8:
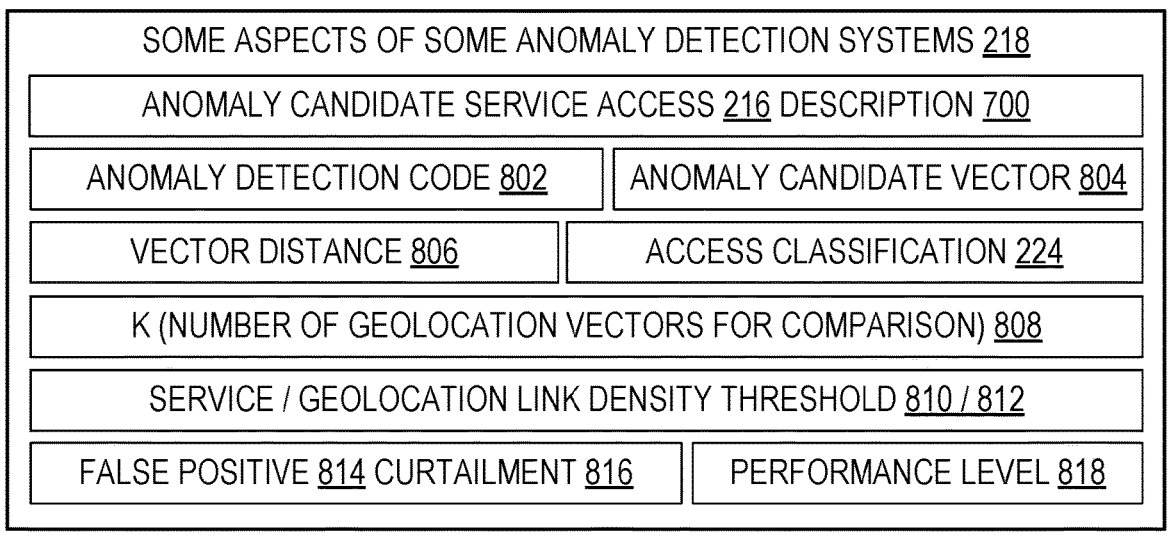
FIG. 8 is a block diagram illustrating some aspects of anomaly detection systems.

FIG. 8 illustrates some aspects of some enhanced anomaly detection systems 218. These items are discussed at various points herein, and additional details regarding them are provided in the discussion of a List of Reference Numerals later in this disclosure document.

Figure 9:
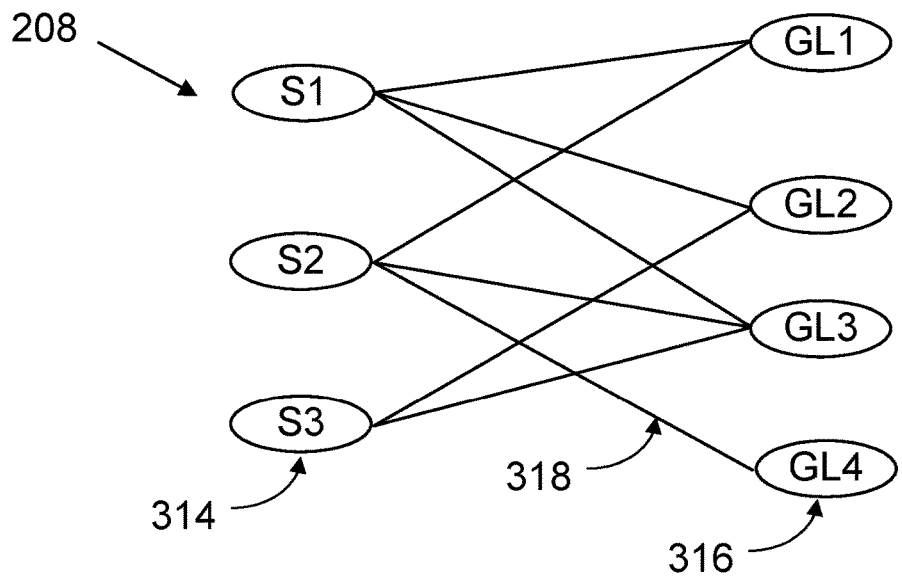
FIG. 9 is an example of a bipartite access graph.

FIG. 9 illustrates a simple hypothetical access graph 208, which has three service nodes 314, four geolocation nodes 316, and eight links 318 between the service node portion of the graph 208 and the geolocation node portion of the graph 208. For simplicity of illustration, this diagram does not expressly show service identifiers 400, geolocation identifiers 500, or access values 310, but one of skill will understand those items are present in actual implementations of a graph 208.

In a production implementation, the number of access graph nodes will also likely be larger than the FIG. 9 example by at least one or two orders of magnitude. For instance, if countries are used as geolocations, there will likely be approximately two hundred geolocation nodes 316. There are 195 countries in the world, but smaller countries might be grouped together on a single node 316, and larger ones might also be partitioned over several nodes 316. The number of service nodes 314 depends on what services are monitored for malicious access. But if service nodes correspond to frequently used APIs, for example, then there may well be hundreds or even thousands of service nodes, even if some APIs are grouped onto the same node 314 and even if a catchall node 314 is used for APIs not otherwise identified. The number of APIs publicly available to developers is over twenty thousand, for example, and growing.

Some embodiments use or provide a functionality-enhanced system, such as system 202 or another system 102 that is enhanced as taught herein. In some embodiments, a system which is configured to perform service access data enrichment and anomaly detection support includes a digital memory 112, and a processor 110 in operable communication with the memory. The processor is configured, e.g., with software 306, to perform service access data enrichment and anomaly detection support steps which include (a) obtaining a map 206 of IP addresses to geolocations, (b) building a bipartite access graph 208 having links 318, each link having a service node 314 and a geolocation node 316 connected by the link, each service node having a service identifier 400 identifying a service 214, each geolocation node having a geolocation identifier 500 identifying a geolocation 308, each link connecting the service node of the link with the geolocation node of the link and having an access value 310 derived from at least one service access 216 from the geolocation to the service, (c) generating a respective service vector 210 for at least one service node, the service vector based on at least the access values of one or more links which connect to the service node, (d) generating a respective geolocation vector 212 for at least one geolocation node, the geolocation vector based on at least the access values of one or more links which connect to the geolocation node, the service vectors and geolocation vectors collectively referred to herein as graph-based vectors 312, and (e) associating at least two of the generated vectors 312 with an anomaly detection system 218. Thus, the cybersecurity data enrichment system 202 is configured to support detection of anomalous service accesses 220 such that a similarity 1210 of two given vectors 312 corresponds with a likelihood 1212 that a given service 214 was non-maliciously accessed.

In some embodiments, the service identifier includes at least one of the following: an identifier 404 which identifies an API 402, an identifier 442 which identifies a web service 440, an endpoint 414 URL 416, a URI 418, a storage resource 406 identifier 408, a network resource 410 identifier 412, a compute resource 432 identifier 434, a software-as-a-service 420 identifier 422, a platform-as-a-service 424 identifier 426, an infrastructure-as-a-service 428 identifier 430, an email service 436 address 438, or another denotation 400 of at least one network-accessible item.

In some embodiments, the geolocation identifier 500 expressly identifies at least one of the following: a building 502, a campus 504, a district 506, a city 508, a metropolitan area 520, a county 510, a province 512, a state 516, a country 514, a region 518 containing multiple countries 514, a legal jurisdiction 524, or a regulatory jurisdiction 522. For convenience, when context is clear one may refer to a particular geolocation identifier with the corresponding geolocation identifier category reference numeral, e.g., by referring to "Israel 514" as an instance of a country 514, or by referring to "Microsoft Redmond 504" as an instance of a campus 504, or by referring to "GDPR jurisdiction 522" (or simply "GDPR 522") as an instance of a regulatory jurisdiction 522.

In some embodiments, the access value 310 includes at least one of the following: an access count 602, an access duration 604, an access frequency 606, an access recency 608, an access distribution 610 over time intervals 612, or another legitimacy confidence 614 value 310 which represents an extent of confidence 614 that the access value arises from non-malicious access actions 216 between the geolocation 308 of the link associated with the access value and the service 214 of the link associated with the access value.

For instance, a link's access value may include an access count 602 indicating that seventeen accesses were made from the geolocation 308 to the service 214, either for all time covered by the underlying access data 302 used to compute the access value, or for access data covering a specified time period. Accesses lasting less than a specified cut-off in duration may be omitted from the count, in some embodiments. Other count variations may also be employed in a given embodiment.

As another example, an access value may include an access duration 604 indicating that accesses which were cumulatively active (e.g., live sessions) for a total of more than two hours, or for a total of one hundred thirty seven minutes, were made from the geolocation 308 to the service 214. Again, the time span covered by the underlying access data 302 will be implicit in that data, or be made explicit when computing the access value. Alternatively or in addition, duration could be a maximum, or a minimum, e.g., an access value may include an access duration 604 indicating that each access lasted at least thirty seconds, or that the longest access was five minutes. Other duration variations may also be employed in a given embodiment.

As another example, an access value may include an access frequency 606 indicating how frequently accesses were made from the geolocation 308 to the service 214, e.g., indicating that the longest time between accesses was eighty-three hours, or that on average six accesses were made per week. The time span covered by the underlying access data 302 will be implicit in that data, or be made explicit when computing the access value. Other frequency variations may also be employed in a given embodiment.

As another example, an access value may include an access recency 608 indicating how recently accesses were made from the geolocation 308 to the service 214, e.g., indicating that the most recent access was seven hours ago, or that no accesses have been made within the past twelve hours. Other recency variations may also be employed in a given embodiment.

As another example, an access value may include an access distribution 610 over time intervals 612 for accesses made from the geolocation 308 to the service 214. For instance, the distribution 610 may indicate how many accesses were made during each two-hour period 612 during the last five days. Other distribution variations may also be employed in a given embodiment.

Moreover, various kinds of access values (e.g., count 602, duration 604, frequency 606, recency 608, distribution 610) may be combined with one another using Boolean expressions, arithmetic expressions, statistical calculations, or other programmatic results, to produce one or more access values 310 that are associated with a given link 318 in the access graph 208 data stricture.

In some embodiments, a cybersecurity data enrichment system 202 is combined with an enhanced anomaly detection system 218. This combination provides an enhanced system 202 which has both functionality 204 for service access data enrichment and functionality 204 for utilizing such enriched data to support anomaly detection.

In some of these combination embodiments, the anomaly detection system 218 portion includes code 802 which upon execution with a processor 110 performs anomaly detection steps. For example, anomaly detection steps may include getting 1104 an anomaly candidate 222 service access description 700 which includes at least a service identifier 400 and a geolocation identifier 500 corresponding to an anomaly candidate service access 216; procuring 1106 an anomaly candidate vector 804 that is based on at least the anomaly candidate service access description 700; calculating 1108 a vector distance 806 using at least the anomaly candidate vector 804; and classifying 1110 the anomaly candidate service access 216 either as anomalous or as non-anomalous, with the classifying based at least in part on the vector distance 806. In a particular instance, the anomaly candidate vector 804 may be a service vector 210, or a geolocation vector 212, for example.

Other system embodiments are also described herein, either directly or derivable as system versions of described processes or configured media, duly informed by the extensive discussion herein of computing hardware. Examples are provided in this disclosure to help illustrate aspects of the technology, but the examples given within this document do not describe all of the possible embodiments. An embodiment may depart from the examples. For instance, items shown in different Figures may be included together in an embodiment, items shown in a Figure may be omitted, functionality shown in different items may be combined into fewer items or into a single item, items may be renamed, or items may be connected differently to one another. A given embodiment may include additional or different technical features, mechanisms, operational sequences, data structures, or functionalities for instance, and may otherwise depart from the examples provided herein.

Processes (a.k.a. Methods)

Figure 10:
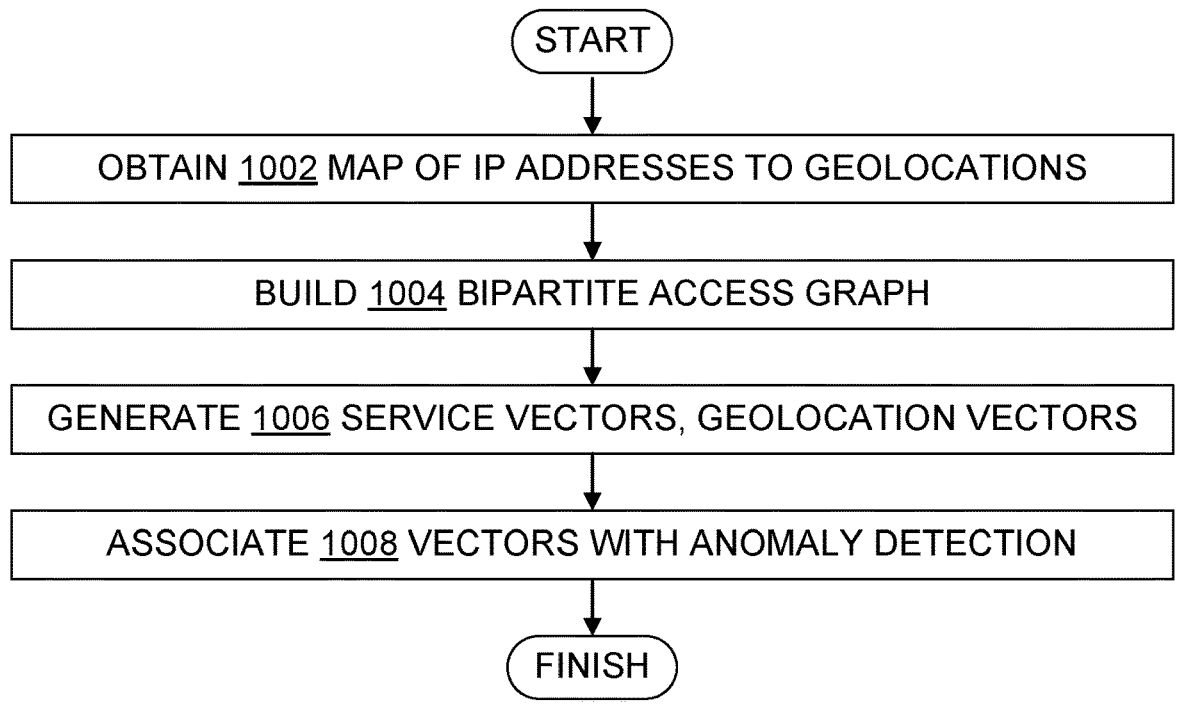
FIG. 10 is a flowchart illustrating steps in some service access data enrichment methods.
Figure 11:
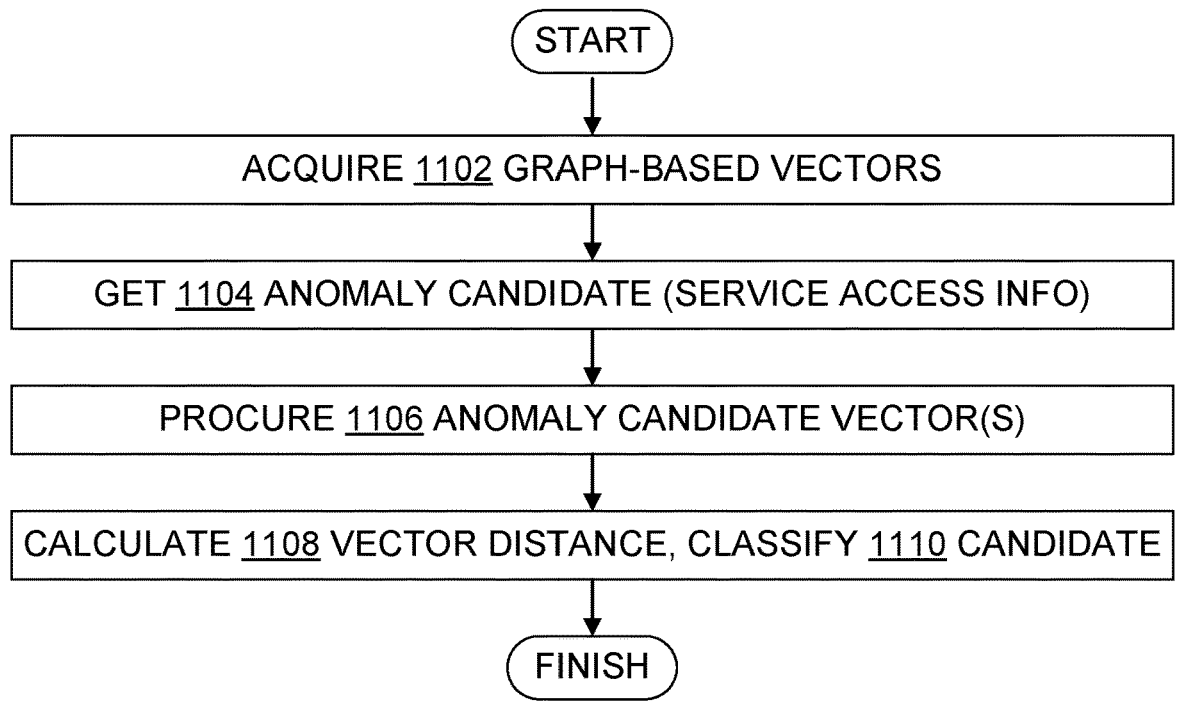
FIG. 11 is a flowchart illustrating steps in some enriched service access data utilization methods.
Figure 12:
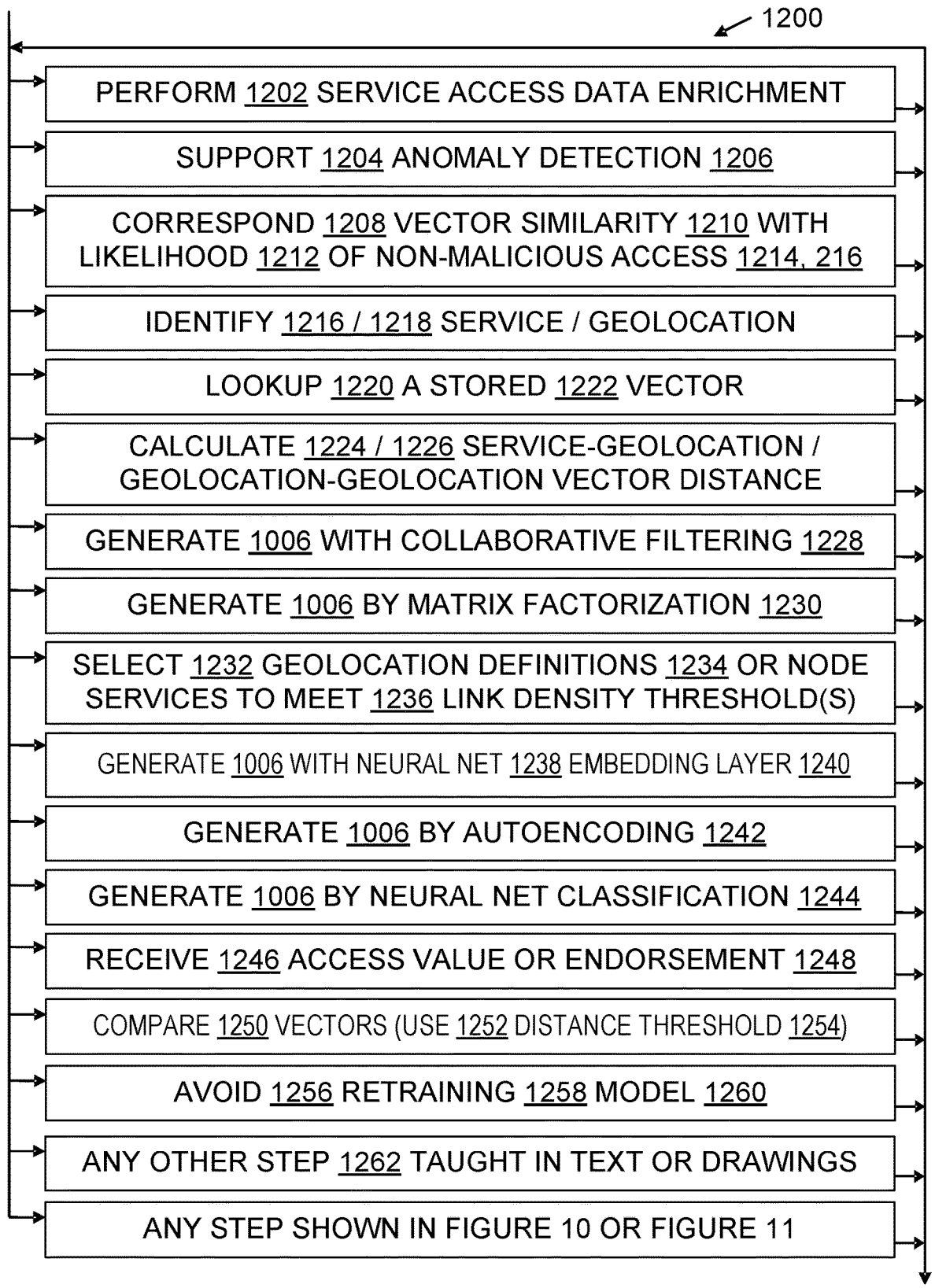
FIG. 12 is a flowchart further illustrating steps in some methods that are also illustrated by FIG. 10 or 11 or both.

FIGS. 10 and 11 each illustrate a family of methods, 1000 and 1100 respectively, that may be performed or assisted by a given enhanced system, such as any system 202 example herein or another functionality 204 enhanced system as taught herein. FIG. 12 further illustrates methods involving graph-based vectors 312. Such methods may also be referred to as graph-based vector "processes" in the legal sense of the word "process". The FIG. 12 methods are suitable for use during operation of a system which has innovative functionality 204 taught herein. FIG. 12 includes some refinements, supplements, or contextual actions for steps shown in FIG. 10 or 11. FIG. 12 also incorporates all steps shown in FIG. 10 or FIG. 11.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For example, in some embodiments a human data scientist may manually choose geolocation definitions 1234, e.g., to specify geolocations at the granularity of cities within a country where a majority of an entity's employees reside while specifying granularity elsewhere at the level of an entire country or even multiple countries per geolocation. But no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 10-12. Steps may be performed serially, in a partially overlapping manner, or fully in parallel. In particular, the order in which flowchart 1000, flowchart 1100, or flowchart 1200 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a cybersecurity method utilizing vector-enriched service access data to support detection of an anomalous service access, including acquiring 1102 a set of graph-based vectors 312 which include one or more service vectors 210 and one or more geolocation vectors 212. The service vectors and the geolocation vectors have been generated 1006 from a bipartite access graph 208. The access graph 208 has links 318. Each link 318 has a service node 314 and a geolocation node 316 connected by the link.

FIG. 9 shows an example access graph 208. Although not shown in FIG. 9, each service node 314 has a service identifier 400 identifying a service 214, and each geolocation node 316 has a geolocation identifier 500 identifying a geolocation 308.

For example, in a particular graph 208 the services 214 identified could include an employee VPN login 410, an administrative portal machine 414, a login for a software-as-a-service offering 420 of the company, an administrative portal 438 for an email service 436 of the company, and a developer portal 402 used by the company's software developers to develop and support the software-as-a-service offering. The geolocations 308 identified could include Israel, United States, GDPR, and Other. Of course, these are only a few of the many possible examples of services 214 and geolocations 308 usable with one or more embodiments.

Each link 318 connects the service node 314 of the link with the geolocation node 316 of the link. Each link 318 has an access value 310 which is derived from at least one service access 216 from the geolocation 308 identified by the geolocation node 316 to the service 214 identified by the service node 314 for that link 318. For example, a link connecting the Israel 514 geolocation node to the developer portal 402 service node could have an access value 310 which indicates how many accesses came from Israel to the developer portal in the past seventy-two hours. Access values 310 may be specific to a particular user or account, or to a particular set of accounts, in a given embodiment, and be tallied for all accesses regardless of account in other embodiments. In practice, a given link 318 may accordingly have multiple associated access values, e.g., one per user account for which at least one access 216 has been logged or captured.

Each service vector 210 corresponds to a service node 314 and is based on at least the access values 310 of links 318 which connect to the service node. In some embodiments, the service vector 210 is based on access values from all of the links that connect to the service node, while in other embodiments the service vector is based on only some of the links' access values. For instance, access values below a threshold may be omitted from the generation basis of the service vector, or access values timestamped outside a specified time period may be omitted when generating the service vector.

Similarly, each geolocation vector 212 corresponds to a geolocation node 316 and is based on at least the access values 310 of links 318 which connect to the geolocation node. In some embodiments, the geolocation vector 212 is based on access values 310 from all of the links 318 that connect to the geolocation node, while in other embodiments the geolocation vector is based on only some of the links' access values, such as those above a specified size threshold or in a specified time period.

Continuing now with steps of the cybersecurity method utilizing vector-enriched service access data to support detection of an anomalous service access, this example method also includes getting 1104 an anomaly candidate service access description 700. The service access description 700 includes at least a service identifier and a geolocation identifier corresponding to an anomaly candidate service access 216. This method also includes procuring

1106 at least one anomaly candidate vector that is based on at least the anomaly candidate service access description, calculating 1108 a vector distance using at least the anomaly candidate vector, and classifying 1110 the anomaly candidate service access either as anomalous or as non-anomalous. The classifying is based at least in part on the vector distance.

Sometimes a service-geolocation distance 806 is used for anomaly detection. For example, in some embodiments the method includes procuring 1106 an anomaly candidate service vector which is a graph-based service vector 210 of a service node for a service 214 that is identified by the anomaly candidate service access description service identifier, procuring 1106 an anomaly candidate geolocation vector 212 which is a graph-based geolocation vector 212 of a geolocation node for a geolocation 308 that is identified by the anomaly candidate service access description geolocation identifier, and calculating 1108 the vector distance between the anomaly candidate service vector and the anomaly candidate geolocation vector. When the distance is relatively small compared to all possible values, so also is the likelihood relatively small that the described service access is anomalous. Likewise, when the distance is relatively large, so is the likelihood that the described service access is anomalous.

In addition to using a service-geolocation distance 806 for anomaly detection, or instead, some embodiments use geolocation-geolocation distance 806. In some, the method procures 1106 an anomaly candidate geolocation vector that is based on at least the anomaly candidate service access description, and calculating the vector distance 806 includes calculating the vector distance between the anomaly candidate geolocation vector 804, 212 and each vector of a set of k graph-based geolocation vectors 212, with k being an integer greater than one. In particular, in some embodiments k is in the range from two to ten, e.g., eight.

In some embodiments, at least one of the graph-based vectors 312 is generated 1006 at least in part by collaborative filtering 1228. In some, all of the graph-based vectors 312 are generated 1006 using collaborative filtering, adapted for use as taught herein. In some, acquiring 1102 a set of graph-based vectors includes generating 1006 at least a portion of the graph-based vectors at least in part by collaborative filtering 1228 along with at least one of the following: matrix factorization 1230, or a neural net 1238 with an embedding layer 1240.

Collaborative filtering is perhaps best known for its use in recommender systems, e.g., a system which tells a consumer "other people who considered buying this item also looked at the following items". A collaborative filtering recommender system may take information about a particular consumer X's purchases, look for other consumers Y and Z who made similar purchases to X, and then recommend to consumer X items that were purchased by Y or Z. An adaptation of collaborative filtering for anomaly detection takes information about service accesses from geolocations, and looks for services that had similar accesses to one another, or geolocations that had similar accesses to one another, or both. An anomaly detection system 218 may then raise an alert or otherwise flag an access anomaly when an anomaly candidate service access is unlike earlier accesses; in this context "unlike" means having a vector distance greater than a specified threshold. For example, if accesses to a VPN 410 usually come from geolocations X, Y, and Z, and then an access to the VPN is made from geolocation W, an alert may be raised. Other kinds of access behavior change may also be flagged. Matrix factorization, neural nets, embedding layers, and other tools and techniques may also be adapted for anomaly detection, by changing the data on which they operate (e.g., service access data 302 rather than consumer goods recommendations data) and the interpretation of results (e.g., greater distances indicate greater anomalousness, rather than indicating less likelihood of purchase by a consumer).

In addition to or in place of collaborative filtering, machine learning tools and techniques such as autoencoding 1242 or neural net classification 1244 are utilized in some embodiments to generate 1006 graph-based vectors 312. An autoencoder is a computational neural network 1238 which learns efficient data codings in an unsupervised manner. Neural net classification 1244 uses computational neural nets 1238 to separate datasets (e.g., service access records 302) into classes, e.g., for anomaly classification 224. One of skill will have at least a general understanding of these machine learning tools and techniques, at least when implementing embodiments that use said tools and techniques.

The technical mechanisms based on collaborative filtering or machine learning are more comprehensive, and more flexible, than an anomaly detection approach based on predefined rules. A predefined rules approach might try to define employee behavior using rules such as: employees do not access files from outside the country, two consecutive VPN accesses by a given employee should not be from places that are in different countries, and so on. But the number and variety of such rules is potentially enormous, so important rules might be easily overlooked. Such rules are also inflexible. An employee may have legitimate business reasons to access files through a VPN from outside the country during a sales trip or for a pitch to investors or a technical conference, for instance. Likewise, the rule against consecutive accesses from different countries makes sense as a precaution when the countries are thousands of miles apart and the accesses are ten minutes apart. But that rule would also generate false positive anomaly alerts when the countries and the access times are close enough to make normal travel a possible explanation for the difference in access origin locations.

Rather than re-generate 1006 vectors, some embodiments look up previously generated and stored vectors when possible. In particular, in some embodiments procuring 1106 the anomaly candidate vector includes looking up 1220 a geolocation vector in the set of graph-based vectors, the looking up based at least in part on the anomaly candidate service access description. Some embodiments include storing 1222 in digital storage 112, for each of multiple services 214, geolocation vectors for geolocations which accessed the service, and classifying 1110 includes comparing 1250 an anomaly candidate geolocation vector to at least two stored geolocation vectors.

One of skill will come to understand that sparsity in the access graph tends to reduce the effectiveness and efficiency of many embodiments. That is, the graph-based vectors 312 tend to provide better support for service access anomaly detection when each of the nodes 314 and 316 has multiple links 318 connected to it. Accordingly, some embodiments include selecting 1232 bipartite access graph geolocation definitions 1234 or selecting 1232 services associated with a service node, or both, such that at least a specified service link density threshold 810 amount of service nodes each have multiple links, or such that at least a specified geolocation link density threshold 812 amount of geolocation nodes each have multiple links, or both. For instance, increasing the geographic scope of a geolocation tends to bring more IP addresses within that geolocation, which in turn tends to bring more service accesses onto the list of service accesses that originated from that geolocation, which increases the number of links from the geolocation node. Geolocations may partition the entire geography of interest (e.g., Earth), or not, but generally do not overlap one another geographically. Similarly, increasing the number of services associated with a service node tends to increase the number of service accesses to that node, which increases the number of links to the service node.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as an access graph 208, graph-based vectors 312, data enrichment code 306, maps 206, anomaly detection code 802, thresholds 810, 812, vector distances 806, geolocation definitions 1234, and service access descriptions 700, in the form of data 118 and instructions 116, read from a removable storage medium 114 and/or another source such as a network connection, to form a configured storage medium. The configured storage medium 112 is capable of causing a computer system 102 to perform technical process steps for enriching service access data or utilizing enriched service access data, as disclosed herein. The Figures thus help illustrate configured storage media embodiments and process (a.k.a. method) embodiments, as well as system and process embodiments. In particular, any of the process steps illustrated in FIGS. 10-12 or otherwise taught herein, may be used to help configure a storage medium to form a configured storage medium embodiment.

Some embodiments focus on enriching service access data to build 1004 graphs 208 and generate 1006 graph-based vectors 210, 212, while others focus on utilizing 1100 the graph-based vectors for anomaly detection 1206; some do both. System embodiments, method embodiments and storage medium embodiments may focus on data enrichment or on enriched data utilization or include both, regardless of whether particular example embodiments under a heading herein only belong to one of these topics.

Some embodiments use or provide a computer-readable storage medium 112, 114 configured with data 118 and instructions 116 which upon execution by at least one processor 110 cause a computing system to perform a service access data vector-enrichment method 1000 to support detection of an anomalous service access. This method includes: obtaining 1002 a map 206 of IP addresses 304 to geolocations 308; building 1004 a bipartite access graph 208 having links 318, each link having a service node 314 and a geolocation node 316 connected by the link, each service node having a service identifier 400 identifying a service 214, each geolocation node having a geolocation identifier 500 identifying a geolocation 308, each link connecting the service node of the link with the geolocation node of the link and having an access value 310 derived from at least one service access 216 from the geolocation to the service; generating 1006 a respective service vector 210 for at least one service node, the service vector based on at least the access values of one or more links which connect to the service node; and generating 1006 a respective geolocation vector 212 for at least one geolocation node, the geolocation vector based on at least the access values of one or more links which connect to the geolocation node, the service vectors and geolocation vectors collectively referred to herein as graph-based vectors 312. By this method, vector-enriched service access data 312 is generated such that a similarity of two given vectors 312 corresponds with a likelihood that a given service was non-maliciously accessed.

In some embodiments, the method includes associating 1008 the generated vectors with an anomaly detection system 218. Thus, the anomaly detection system is configured for utilizing 1100 at least one of the vectors to support detection 1206 of anomalous service accesses, and to do so with anomaly false positive 814 curtailment 816 relative to service access anomaly detection which does not map IP addresses to geolocations.

In some embodiments, the method includes receiving 1246 from a human user at least one access value 310, or receiving or an endorsement 1248 of at least one access value by a human user, or receiving 1248 both an access value and an access value endorsement of another access value. Receipt 1248 of an access value from a person may be treated as an endorsement of that access value by that person.

In some embodiments, generating 1006 at least a portion of the graph-based vectors 312 includes collaborative filtering 1228 with matrix factorization 1230. In some, generating 1006 at least a portion of the graph-based vectors 312 includes autoencoding 1242, neural net classification 1244, or another machine learning technique.

In some embodiments, the method includes storing 1222, for each of multiple services 214, geolocation vectors 212 for geolocations 308 which accessed the service, and comparing 1250 an anomaly candidate geolocation vector to at least two stored geolocation vectors while classifying 1110 an anomaly candidate service access either as anomalous or as non-anomalous. In some embodiments, this approach avoids 1256 retraining 1258 that would modify graph-based geolocation vectors based on anomaly candidate service accesses which occur after the vector-enriched service access data is generated.

Some embodiments are suitable for production use, e.g., in an enterprise, institution, agency, or other professional environment. In some, the enhanced computing system 202 performs anomaly classification 1110 using graph-based vectors 312 at a performance level 818 providing at least one thousand classifications 224 in a thirty minute period, with some embodiments performing at a level 818 of at least ten thousand classifications within thirty minutes, and some embodiments performing at a level 818 of at least one hundred thousand classifications within thirty minutes. These performance levels—even the lowest one—may be requirements in a given environment to meet service level agreement (SLA) criteria for security, or to exceed the malicious access detection system performance of a competitor, for example. One of skill will acknowledge that such performance levels—even the lowest one—are not within reach of purely mental activity but instead require an enhanced computing system 202.

Technical Character

The technical character of embodiments described herein will be apparent to one of ordinary skill in the art, and will also be apparent in several ways to a wide range of attentive readers. Some embodiments address technical activities such as service access anomaly detection 1206, curtailment 816 of anomaly false positives 814, and classification 1110 through use of machine learning, each of which is an activity deeply rooted in computing technology. Some of the technical mechanisms discussed include, e.g., an IP address to geolocation map 206, service access description data structures 700, a bipartite access graph 208, collaborative filtering 1228, neural nets 1238, autoencoding 1242, graph-based vectors 312, and vector distances 806. Some of the technical effects discussed include, e.g., classification 1110 of service access anomaly candidates 222 at production levels 818 of performance not available through human activity alone, curtailment 816 of false positives 814, and avoidance 1256 of machine learning model 1260 retraining 1258 without unacceptable stagnancy despite use of the same model over weeks, or even longer periods of time. Thus, purely mental processes are clearly excluded. Other advantages based on the technical characteristics of the teachings will also be apparent to one of skill from the description provided.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments enrich geo-mapping feeds with semantic geolocations 308. To compute these semantic vector representations 312, one could choose from a wide range of embedding techniques, e.g., collaborative filtering 1228, autoencoders 1242, neural net classifiers 1244 with an embedding layer 1240 for the geolocation 308 and service 214. Some embodiments build 1004 a bipartite graph 208 of geolocations to services with the number of times accessed 310 and then apply collaborative filtering 1228 with implicit feedbacks.

Once these vectors 312 are calculated per geolocation and per service based on trained data, an embodiment may use either or both of two utilization approaches. Under a service-geolocation distance approach, when a new access 216 takes place between a geolocation and a service the embodiment does 1250, 1224 a dot product between the vector 804 of the geolocation and that of the service. If the dot product value 806 is below some predefined threshold 1254 then the access is determined 1110 to be anomalous 220. Note that this approach is accurate but works best with continuous retraining 1258.

Under a geolocation-geolocation distance approach, vectors 212 of geolocations that accessed a service 214 in the past are stored 1222 for that service. When a new access 216 takes place the vector 804 of the access geolocation is compared to past vectors 212. If the cosine distance to all of the top-k (k 808 is configurable) nearest historical vectors 212 is above some threshold 1254 then an alert is triggered to highlight an anomaly 220. This approach doesn't rely on retraining 1258 and can use the same semantic vectors of the geolocations many times over weeks or even months.

To help make the vectors 312 stable, training of the geolocation or service embedding model can be done separately on a per-organization or other group basis. In an organization such as Microsoft Corporation, for instance, a model 1260 could learn that a Herzliya geolocation and a Redmond geolocation should have similar vectors, since it is common for people to access Microsoft services 214 from these two geolocations because people often travel between these two geolocations.

As to both approaches, false positive curtailment 816 relative to other technology is provided. Simply alerting whenever a new location (e.g., different IP address, or even different geolocation) originates a service access tends to create too many false positives 814. Approaches may cluster locations based on physical distances between them, however, in the cyber world access may not be limited to physical distances, e.g., it is not unusual for clients to access a service 214 from multiple far-away locations due to VPNs or even for well-traveled employees of global companies to access services from different work sites.

In some embodiments, the geolocation and the service are both assigned vectors with equal ranks, so doing a dot product between them is straightforward. The vectors may be generated such that the dot product produces an estimated access-likelihood score. This generation technique is based on collaborative filtering, which is adapted from its use recommendation systems for use as taught herein for anomaly detection.

In some embodiments, vectors that accessed a service in the past are stored for each service. When a new access takes place the vector of the access geolocation is compared to past vectors. A trained model having vectors 312 may be used as follows. If geolocation GL1 accesses service S1 then if, during training GL1 already accessed S1, this latest access is not an anomaly. But if this access didn't occur during training, then the model assigns a likelihood score for this access. If the access is deemed unlikely then the extent of unlikelihood is an indicator for potentially triggering alerts.

Some embodiments may be discernable through black box testing. One may provide access patterns with IPs (or anything else denoting service origination) that maps to geolocations for training the model, and see whether it produces semantic vectors based on the access. Moreover, an embodiment may be documented to explain geolocation definition and usage, particularly if the embodiment is shipped or utilized in or as a geo-anomaly component.

Some embodiments utilize service access data enrichment to support anomaly detection while reducing or avoiding false positives that are due to user travel, virtual private network usage, or other departures from a strict pairing of locations to services. In some, a cybersecurity data enrichment system is configured to support detection of anomalous service accesses such that a similarity of two given geolocation vectors corresponds with a likelihood that a given service was non-maliciously accessed from those two geolocations.

Some embodiments described herein may be viewed by some people in a broader context. For instance, concepts such as connections, consistency, error, location, and security may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively reduce false positives when checking for unusual or suspicious efforts to use network-accessible resources. Other configured storage media, systems, and processes involving connections, consistency, error, location, or security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating environments, entity examples, software processes, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
IaaS or IAAS: infrastructure-as-a-service
ID: identification or identity
IoT: Internet of Things
IP: internet protocol
LAN: local area network
ML: machine learning
OS: operating system
PaaS or PAAS: platform-as-a-service
PCI-DSS: Payment Card Industry Data Security Standard
RAM: random access memory
ROM: read only memory
SIEM: security information and event management; also refers to tools which provide security information and event management; may also be referred to as SEIM (security event and information management)
TCP: transmission control protocol
TPU: tensor processing unit
UDP: user datagram protocol
UEFI: Unified Extensible Firmware Interface
URI: uniform resource identifier
URL: uniform resource locator
WAN: wide area network
Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

A "legal jurisdiction" is a location or set of locations subject to a particular law or set of laws of interest. A country 514 is typically also a legal jurisdiction 524, but a country may also contain smaller legal jurisdictions, e.g., individual states of the United States may have different respective data breach notification laws.

A "regulatory jurisdiction" is a location or set of locations subject to a particular regulation or set of regulations of interest. A regulation may be a law, in which case the regulatory jurisdiction is also a legal jurisdiction. A "regulation" as defined herein may also be an industry standard, e.g., PCI-DSS, which does not have the force of law throughout the regulatory jurisdiction. GDPR is an example of a regulatory jurisdiction which happens to include multiple legal jurisdictions with regard to laws other than the GDPR regulation itself.

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Data enrichment and enriched data utilization operations such as access graph building 1004, vector generation 1006, vector distance calculation 1108, and many other operations discussed herein, are understood to be inherently digital. A human mind cannot interface directly with a CPU or other processor, or with RAM or other digital storage, to read and write the necessary data to perform the service access data enrichment and enriched data utilization steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, associating, building, calculating, classifying, comparing, corresponding, generating, getting, identifying, obtaining, performing, procuring, receiving, retraining, selecting, supporting (and acquires, acquired, associates, associated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re *Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., an analyst or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, browsers, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computers, e.g., computers 102 enhanced with vector-enriched data functionality, or computers which perform a method 1200, 1100, or 1000

204 vector-enriched data functionality, e.g., functionality which does at least one of the following: builds a bipartite access graph 208, generates graph-based vectors 312, accesses graph-based vectors 312, calculates a distance 806 between graph-based vectors 312, classifies 1110 anomaly candidates 222 based at least in part on graph-based vectors 312, conforms with the FIG. 12 flowchart or its constituent flowcharts 1100 or 1000, or otherwise provides capabilities first taught herein 206 IP address to geolocation map (a digital data structure); 206 also refers to the act of creating or using such a map 208 bipartite access graph having service nodes, geolocation nodes, and links connecting them; FIG. 9 shows an example 210 service vector (digital data structure or other set of digital values)

212 geolocation vector (digital data structure or other set of digital values 214 service, namely a network-accessible interface or resource; some examples are APIs 402, storage resources 406, network resources 410, compute resources 432, endpoints 414, SaaS offerings 420, PaaS offerings 424, IaaS offerings 428, email services 436, and others identified in this disclosure or provided via a server or other networked device 102

216 access; refers to a verb or a noun herein, depending on context; includes successful accesses and unsuccessful access attempts, unless stated otherwise 218 anomaly detection system, e.g., a system 102 configured to computationally detect anomalies 220

220 anomaly, e.g., an event or set of events in a system 102 which indicate unusual or suspect behavior 222 anomaly candidate, e.g., a potential anomaly which is being investigated or has been flagged for investigation 224 classification; used as a noun, e.g., to denote a communication or value indicating a result of processing by an anomaly detection system 302 service access data, e.g., log entries, real-time packet captures, or other data 118 that describes accesses 216 from IP addresses to services 304 IP address; may be IPv4 or IPv6 format 306 enrichment code, e.g., software which upon execution does one or more of the following: builds 1004 or modifies an access graph, generates 1006 graph-based vectors, or obtains 1002 an IP address to geolocation map on behalf of software which constructs an access graph 208 or vectors 312

308 geolocation, e.g., any of items 502 through 524 or combinations thereof

310 access value, e.g., any of the digital values shown in FIG. 6 or values computed from such values

312 graph-based vector, e.g., a vector generated computationally from an access graph 208; may be, e.g., an anomaly candidate vector a vector 210 or 212 which is used solely for training a machine learning model 1260 that is based on an access graph 208

314 service node data structure within an access graph 208 data structure

316 geolocation node data structure within an access graph 208 data structure

318 link data structure within an access graph 208 data structure; links may also be called "edges"

320 interface to an anomaly detection system, e.g., system 218 API

322 interface generally between two or more computing systems 102

400 service identifier, e.g., index, string, name, address, pointer, URL, URI, or other digital denotation of a service 214

402 application program interface (API)

404 API identifier

406 storage resource, e.g., object storage, file storage, block storage, blob storage, storage volume, virtual tape, file gateway, or other network storage

408 storage resource identifier

410 network resource, e.g., port, socket, connection, session, bandwidth, or other network transmission capability; 410 may also refer to physical or virtual network devices as part of a path traveled by network communications

412 network resource identifier

414 endpoint on a network, e.g., laptops, workstation, mobile phone, smartphone, tablet, server, virtual environment, or other end location in a network

416 endpoint URL or other endpoint identifier

418 uniform resource locator (URL)

420 software-as-a-service (SaaS) offering

422 SaaS identifier

424 platform-as-a-service (PaaS) offering

426 PaaS identifier

428 infrastructure-as-a-service (IaaS) offering

430 IaaS identifier

432 compute resource, e.g., server, cluster, processor set, processor core, or other network-accessible computing capability; 432 may also refer to physical or virtual network devices that generate or transform data

434 compute resource identifier

436 email service

438 address of email service

440 web service, e.g., service accessed via a web site

442 web service identifier

500 geolocation identifier

502 building; 502 refers to an identified building or to an identification of a building, according to context

504 campus; 504 refers to an identified campus or to an identification of a campus, according to context

506 district; 506 refers to an identified district or to an identification of a district, according to context

508 city; 508 refers to an identified city or to an identification of a city, according to context

510 county; 510 refers to an identified county or to an identification of a county, according to context

512 province; 512 refers to an identified province or to an identification of a province, according to context

514 country; 514 refers to an identified country or to an identification of a country, according to context

516 state, e.g., Utah; 516 refers to an identified state or to an identification of a state, according to context

518 multi-country region, e.g., Europe; 518 refers to an identified multi-country region or to an identification of a multi-country region, according to context

520 metropolitan area; 520 refers to an identified metropolitan area or to an identification of a metropolitan area, according to context

522 regulatory jurisdiction; 522 refers to an identified regulatory jurisdiction or to an identification of a regulatory jurisdiction, according to context

524 legal jurisdiction; 524 refers to an identified legal jurisdiction or to an identification of a legal jurisdiction, according to context

602 count; an example of an access value; may be, e.g., a tally of accesses generally from the geolocation to the service for the nodes connected to the link with which the access value is associated, or a tally of successful accesses, or a tally of unsuccessful accesses; may be, e.g., for a specified time period; e.g., a count value indicating 37 accesses of any kind from Paris to the VPN portal in the past sixty minutes

604 duration; an example of an access value; may be, e.g., a sum of durations of accesses generally from the geolocation to the service for the nodes connected to the link with which the access value is associated, or a sum of durations of successful accesses, or a sum of durations of unsuccessful accesses; may be, e.g., for a specified time period; e.g., a duration value indicating connections cumulatively lasting three minutes from London to the email server during the past four weeks

606 frequency; an example of an access value; as with other access values, may be, e.g., for particular kinds of accesses or for accesses during a specified time period; e.g., a frequency value indicating an average of two accesses per minute during the past five minutes

608 recency; an example of an access value; as with other access values, may be, e.g., for particular kinds of accesses or for accesses during a specified time period; e.g., a recency value indicating no accesses within the past three days

610 distribution over time intervals; an example of an access value; as with other access values, may be, e.g., for particular kinds of accesses or for accesses during a specified time period; e.g., a distribution value indicating at least two accesses per hour within the past ten hours

612 time interval

614 any value in memory 112 used to indicate a level or amount of confidence in the legitimacy or non-maliciousness of one or more accesses between a geolocation and a service

700 service access description data structure; may be implemented, e.g., as raw service access data 302 combined with an IP-to-geolocation map 206, or as a data structure without an explicit IP address but with a service ID 400 and a geolocation ID 500

802 anomaly detection code, e.g., software which does any step of method 1100, or which does any step producing or utilizing one or more of the following: a service access description 700 of an anomaly candidate 222, or a vector distance 806 of graph-based vectors 312, an anomaly candidate vector 804

804 anomaly candidate vector, e.g., a vector computed from the access graph 208 and an anomaly candidate service access description; e.g., in the context of FIG. 5 9 suppose an anomaly candidate service access description describes a new access 216 (anomaly candidate) from GL1 to S3, then an anomaly candidate geolocation vector may be computed using the two existing links connected to GL1 that are shown in FIG. 9 plus the new access from GL1 to S3

806 vector distance, e.g., a dot product or cosine distance or Minkowski distance

808 parameter k indicating how many stored geolocation vectors are compared with an anomaly candidate geolocation vector is some embodiments

810 service link density threshold, e.g., minimum allowable number of links into each service node 314

812 geolocation link density threshold, e.g., minimum allowable number of links from each geolocation node 316

814 false positive, e.g., a classification of an access as malicious when the access does not actually pose any greater risk than other accesses from the same geolocation node or other accesses to the same service node

816 curtailment of false positives, e.g., reduction or avoidance of false positives in comparison to anomaly detection approaches which do not utilize graph-based vectors 312 as taught herein

818 performance level of an anomaly detection system

1000 flowchart; 1000 also refers to service access data enrichment methods illustrated by or consistent with the FIG. 10 flowchart

1002 obtain a map 206 of IP addresses to geolocations; performed computationally, e.g., by processor 110 execution of software, or network 108 transmission, or both; a map 206 may be obtained, e.g., by receiving the map into memory 112, by locating in memory 112 a previously stored map, by performing computation which creates or modifies the map, or by a combination of such steps

1004 build a bipartite access graph 208; performed computationally; may include retrieving previously built bipartite access graph 208 data

1006 generate graph-based vector; performed computationally, e.g., using a bipartite access graph 208 and one or more of collaborative filtering, autoencoding, a neural net, or another machine learning tool or technique

1008 associate graph-based vectors with anomaly detection; performed computationally, e.g., by providing or invoking an anomaly detection system interface 320

1100 flowchart; 1100 also refers to enriched service access data utilization methods illustrated by or consistent with the FIG. 11 flowchart

1102 acquire graph-based vectors 312; performed computationally, e.g., using network 108 transmission, reading data 118 from files or blobs or other storage 112, or both

1104 get an anomaly candidate, e.g., service access data 302 or a service access description 700 for an access 216 which is to be checked for anomalousness by an enhanced anomaly detection system 218; performed computationally, e.g., using network 108 transmission or packet capture

1106 procure one or more anomaly candidate vectors based on an anomaly candidate; performed computationally, e.g., by generating 1006 a service vector 210 or a geolocation vector 212 using the anomaly candidate data

1108 calculate a vector distance 806 using at least one anomaly candidate vector; performed by a computing system

1110 classify an anomaly candidate as to its anomalousness; performed by an enhanced anomaly detection system 218 or otherwise computationally using at least one anomaly candidate vector

1200 flowchart; 1200 also refers to graph-based vector generation or utilization methods illustrated by or consistent with the FIG. 12 flowchart (which incorporates the steps of FIGS. 11 and 10)

1202 perform service access data enrichment; perform computationally, e.g., by any one or more of steps 1004, 1006, 1106

1204 support anomaly detection, e.g., by computationally performing any one or more of steps 1102, 1106, 1008, 1202

1206 anomaly detection; used herein as a noun or as a verb; computationally check whether an anomaly candidate is anomalous

1208 correspond vector similarity with a likelihood of access maliciousness or legitimacy, e.g., by generating 1006 graph-based vectors 312 and calculating 1108 distance 806 between them

1210 vector similarity, e.g., as indicated by the distance 806 between two vectors, whereby smaller distance indicates greater similarity and vice versa

1212 value in memory 112 indicating a likelihood of access maliciousness or legitimacy

1214 non-malicious access; also referred to herein as legitimate access; maliciousness depends on context, e.g., who performed it, whether their authority was exceeded by the access, what was accessed, and so on

1216 identify a service, e.g., create or alter or use a service identifier

1218 identify a geolocation, e.g., create or alter or use a geolocation identifier

1220 computationally look up a stored vector

1222 computationally store a vector

1224 calculate a distance 806 between a service vector and a geolocation vector; step 1224 is an example of step 1108

1226 calculate a distance 806 between two geolocation vectors; step 1226 is an example of step 1108

1228 collaborative filtering; an example of a computational tool or technique for generating 1006 vectors 312 (including candidate vectors 804)

1230 matrix factorization; performed computationally in some collaborative filtering implementations

1232 computationally select geolocation definitions, e.g., in an iterative manner by changing geolocation size to adjust the minimum number of links per node

1234 geolocation definition, e.g., a list or other data structure indicating which IP addresses are mapped to a given geolocation; a map 206 may be viewed as a set of geolocation definitions, but a geolocation definition may also include other data, e.g., a user-friendly name string

1236 meet or satisfy a link density threshold 810 or 812 or both

1238 computational neural net; may be convolutional, deep, autoencoding, or another kind of neural net

1240 embedding layer of a computational neural net

1242 autoencoding tool or technique 1244 classification of an anomaly candidate by a neural net; an example of classification 224
1246 receive data in a computing system 102; performed by computing system
1248 endorsement of an access value, e.g., data indicating the access value has been reviewed and confirmed by an authorized user
1250 compare vectors, e.g., by calculating a distance 806 between the vectors, or by checking storage when looking up 1220 a vector
1252 computationally use a vector distance threshold, e.g., by determining whether the threshold is exceeded by a vector distance
1254 vector distance threshold value; may be default or administrator-configurable in some embodiments
1256 avoid retraining a model
1258 retrain a model, e.g., update nodes of the access graph 208 and regenerate graph-based vectors for the updated nodes
1260 machine learning model, e.g., an access graph 208 and corresponding graph-based vectors 312
1262 any step discussed in the present disclosure that has not been assigned some other reference numeral Conclusion In short, the teachings herein provide a variety of graph-based vector functionalities 204 which operate in enhanced systems 202. Cybersecurity is enhanced, with particular attention to malicious attempts to access networked resources 406, 410, 432 or other services 214. Enriched 1202 access data 312 supports 1204 anomaly detection 1206 to enhance network 108 cybersecurity. Network access data 302 is enriched 1202 using service nodes 314 representing resource 406, 410, 432 provision and other services 214, with geolocation nodes 316 representing grouped 1232 access origins 304, and access values 310 representing access 216 legitimacy confidence 614. Data enrichment 1202 provides a trained model 1260 by mapping 206 IP addresses 304 to geolocations 308, building 1004 a bipartite access graph 208 whose inter-node links 318 indicate aspects 310 of accesses 216 from geolocations 308 to services 214, and generating 1006 semantic vectors 312 from the graph 208. Vector generation 1006 may include collaborative filtering 1228, autoencoding 1242, neural net 1238 embedding 1240, and other machine learning tools and techniques. Anomaly detection systems 218 then calculate 1108 service-geolocation 1224 or geolocation-geolocation 1226 vector distances 806 with anomaly candidate 222 vectors 804 and the model's graph-based vectors 312, and treat 1252 distances 806 past a threshold 1254 as anomaly 220 indicators. Some embodiments curtail 816 false positives 814 relative to simply checking network access logs or packets for activity 216 coming from unexpected places. Some embodiments avoid 1256 or reduce 1256 model 1260 retraining 1258.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10-12 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity data enrichment system, comprising:
a digital memory; and
a processor in operable communication with the digital memory, the processor configured to perform service access data enrichment and anomaly detection support steps which include (a) obtaining a map of IP addresses to geolocations, (b) building a bipartite access graph having links, each link having a service node and a geolocation node connected by the link, each service node having a service identifier identifying a service, each geolocation node having a geolocation identifier identifying a geolocation, each link connecting the service node of the link with the geolocation node of the link and having an access value derived from at least one service access from the geolocation to the service, (c) generating a respective service vector for at least one service node, the service vector based on at least the access values of one or more links which connect to the service node, (d) generating a respective geolocation vector for at least one geolocation node, the geolocation vector based on at least the access values of one or more links which connect to the geolocation node, the service vectors and geolocation vectors collectively referred to herein as graph-based vectors, and (e) associating at least two of the generated vectors with an anomaly detection system;
whereby the cybersecurity data enrichment system is configured to support detection of anomalous service accesses such that a similarity of two given vectors corresponds with a likelihood that a given service was non-maliciously accessed.

2. The cybersecurity data enrichment system of claim 1, wherein the service identifier includes at least one of the following: an API identifier, a web service identifier, an endpoint URL, a URI, a storage resource identifier, a network resource identifier, a compute resource identifier, a software-as-a-service identifier, a platform-as-a-service identifier, an infrastructure-as-a-service identifier, an email service address, or another denotation of at least one network-accessible item.

3. The cybersecurity data enrichment system of claim 1, wherein the geolocation identifier expressly identifies at least one of the following: a building, a campus, a district, a city, a metropolitan area, a county, a province, a state, a country, a region containing multiple countries, a legal jurisdiction, or a regulatory jurisdiction.

4. The cybersecurity data enrichment system of claim 1, wherein the access value includes at least one of the following: an access count, an access duration, an access frequency, an access recency, an access distribution over time intervals, or another legitimacy confidence value which represents an extent of confidence that the access value arises from non-malicious access actions between the geolocation of the link associated with the access value and the service of the link associated with the access value.

5. The cybersecurity data enrichment system of claim 1, in combination with the anomaly detection system.

6. The combined cybersecurity data enrichment system and anomaly detection system of claim 5, wherein the anomaly detection system comprises code which upon execution performs anomaly detection steps which include (f) getting an anomaly candidate service access description which includes at least a service identifier and a geolocation identifier corresponding to an anomaly candidate service access, (g) procuring an anomaly candidate vector that is based on at least the anomaly candidate service access description, (h) calculating a vector distance using at least the anomaly candidate vector, and (i) classifying the anomaly candidate service access either as anomalous or as non-anomalous, the classifying based at least in part on the vector distance.

7. A cybersecurity method utilizing vector-enriched service access data to support detection of an anomalous service access, the method comprising:

acquiring a set of graph-based vectors which include one or more service vectors and one or more geolocation vectors, the service vectors and the geolocation vectors generated from a bipartite access graph having links, each link having a link service node and a link geolocation node connected by the link, each link service node having a service identifier identifying a service, each link geolocation node having a geolocation identifier identifying a geolocation, each link connecting the link service node of the link with the link geolocation node of the link and having an access value derived from at least one service access from the geolocation to the service, each service vector corresponding to a respective service node and based on at least the access values of all links which connect to the respective service node, each geolocation vector corresponding to a respective geolocation node and based on at least the access values of all links which connect to the respective geolocation node;

getting an anomaly candidate service access description which includes at least a service identifier and a geolocation identifier corresponding to an anomaly candidate service access;

procuring at least one anomaly candidate vector that is based on at least the anomaly candidate service access description;

calculating a vector distance using at least the anomaly candidate vector; and classifying the anomaly candidate service access either as anomalous or as non-anomalous, the classifying based at least in part on the vector distance.

8. The method of claim 7, comprising:

procuring an anomaly candidate service vector which is a graph-based service vector of a service node for a service that is identified by the anomaly candidate service access description service identifier;

procuring an anomaly candidate geolocation vector which is a graph-based geolocation vector of a geolocation node for a geolocation that is identified by the anomaly candidate service access description geolocation identifier; and calculating the vector distance between the anomaly candidate service vector and the anomaly candidate geolocation vector.

9. The method of claim 7, wherein the method procures an anomaly candidate geolocation vector that is based on at least the anomaly candidate service access description, and wherein calculating the vector distance includes calculating the vector distance between the anomaly candidate geolocation vector and each vector of a set of k graph-based geolocation vectors, with k being an integer greater than one.

10. The method of claim 7, wherein at least one of the graph-based vectors is generated at least in part by collaborative filtering.

11. The method of claim 7, wherein procuring the anomaly candidate vector comprises looking up a geolocation vector in the set of graph-based vectors, the looking up based at least in part on the anomaly candidate service access description.

12. The method of claim 7, further comprising selecting bipartite access graph geolocation definitions or services associated with a service node, or both, such that at least a specified service link density threshold amount of service nodes each have multiple links, or such that at least a specified geolocation link density threshold amount of geolocation nodes each have multiple links, or both.

13. The method of claim 7, wherein:

the method further comprises storing, for each of multiple services, geolocation vectors for geolocations which accessed the service; and classifying comprises comparing an anomaly candidate geolocation vector to at least two stored geolocation vectors.

14. The method of claim 7, wherein acquiring the set of graph-based vectors comprises generating at least a portion of the graph-based vectors at least in part by collaborative filtering with at least one of the following: matrix factorization, or a neural net with an embedding layer.

15. The method of claim 7, wherein acquiring the set of graph-based vectors comprises generating at least a portion of the graph-based vectors at least in part by at least one of the following: autoencoding or neural net classification.

16. A computer-readable storage medium configured with data and instructions which upon execution by a processor cause a computing system to perform a service access data vector-enrichment method to support detection of an anomalous service access, the method comprising:

obtaining a map of IP addresses to geolocations;

building a bipartite access graph having links, each link having a service node and a geolocation node connected by the link, each service node having a service identifier identifying a service, each geolocation node having a geolocation identifier identifying a geolocation, each link connecting the service node of the link with the geolocation node of the link and having an access value derived from at least one service access from the geolocation to the service;

generating a respective service vector for at least one service node, the service vector based on at least the access values of one or more links which connect to the service node; and generating a respective geolocation vector for at least one geolocation node, the geolocation vector based on at least the access values of one or more links which connect to the geolocation node, the service vectors and geolocation vectors collectively referred to herein as graph-based vectors;

whereby vector-enriched service access data is generated such that a similarity of two given vectors corresponds with a likelihood that a given service was non-maliciously accessed.

17. The computer-readable storage medium of claim 16, wherein the method further comprises associating the generated vectors with an anomaly detection system, whereby the anomaly detection system is configured for utilizing at least one of the vectors to support detection of anomalous service accesses, with anomaly false positive curtailment relative to service access anomaly detection which does not map IP addresses to geolocations.

18. The computer-readable storage medium of claim 16, wherein the method further comprises receiving from a human user at least one access value or an endorsement of at least one access value, or both.

19. The computer-readable storage medium of claim 16, wherein generating at least a portion of the graph-based vectors comprises collaborative filtering with matrix factorization.

20. The computer-readable storage medium of claim 16, wherein the method further comprises:
- storing, for each of multiple services, geolocation vectors for geolocations which accessed the service;
- comparing an anomaly candidate geolocation vector to at least two stored geolocation vectors while classifying an anomaly candidate service access either as anomalous or as non-anomalous; and
- avoiding retraining which modifies graph-based geolocation vectors based on anomaly candidate service accesses which occur after the vector-enriched service access data is generated.

\* \* \* \* \*